Patented Oct. 25, 1938

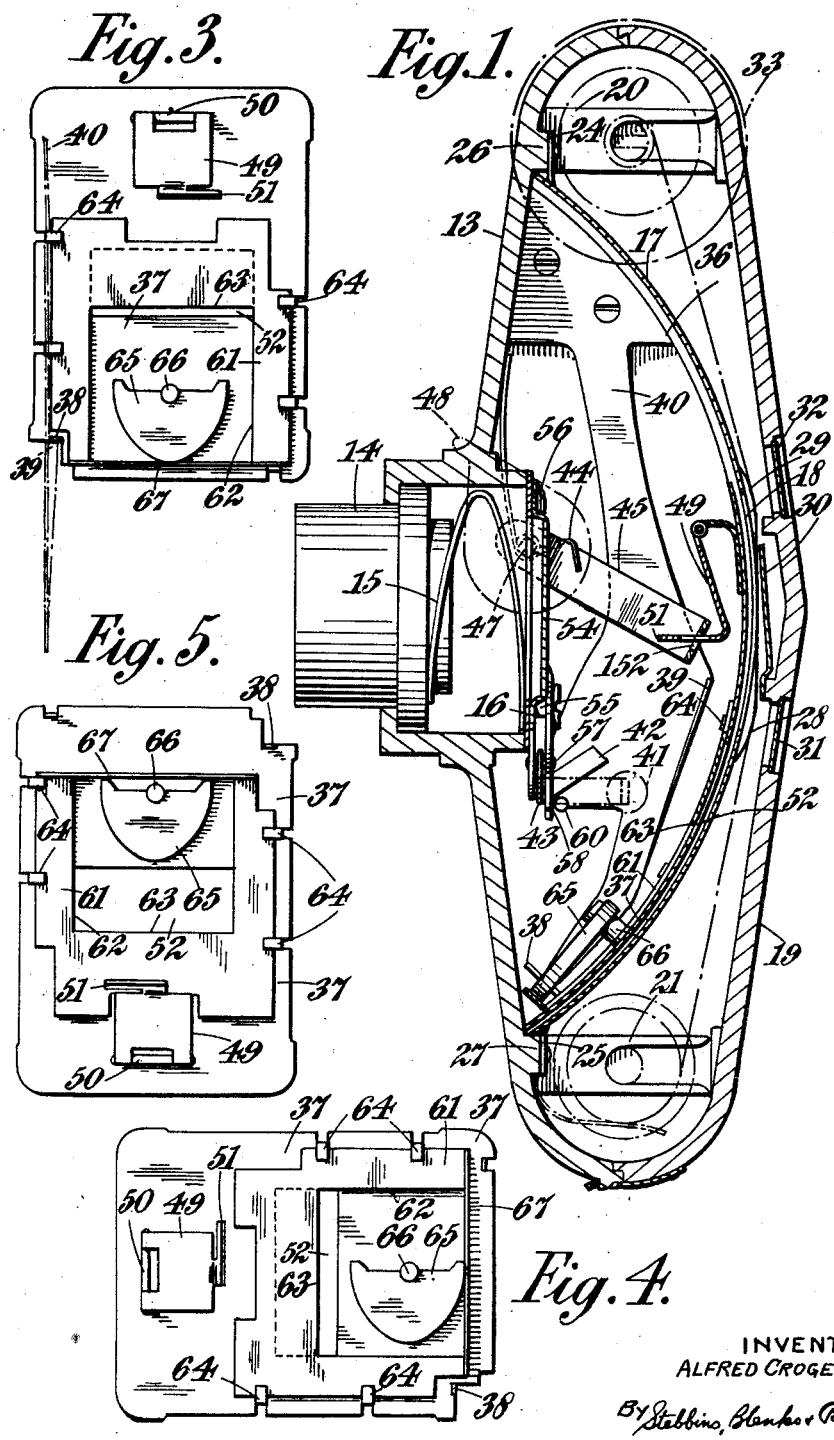

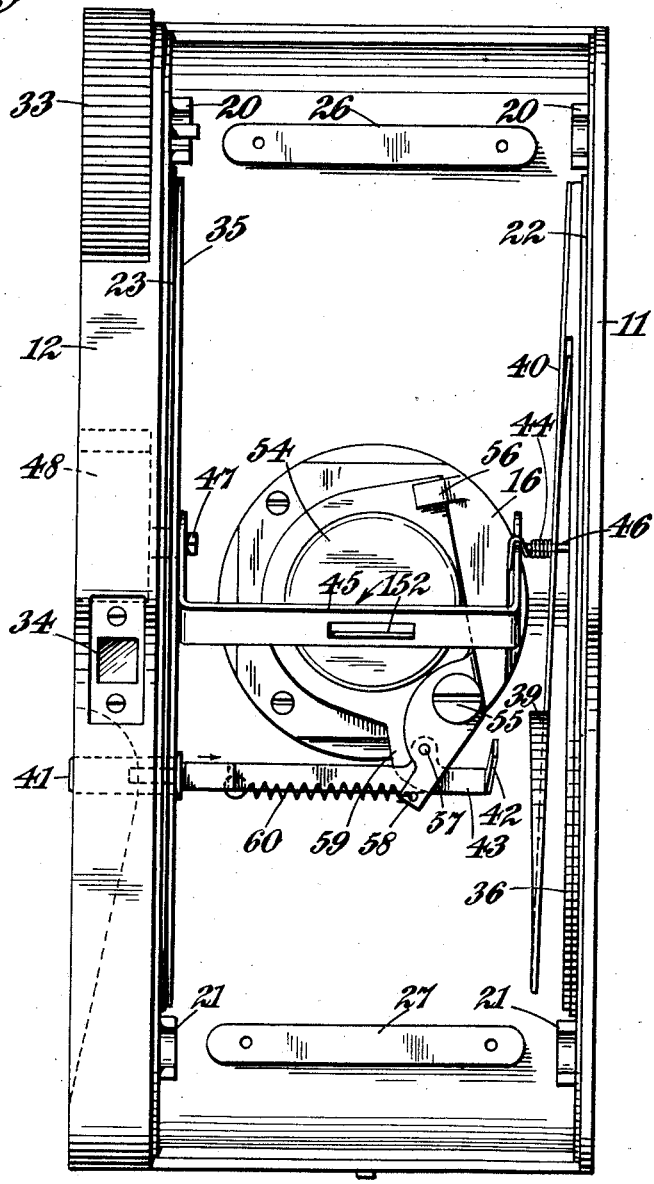

2,134,307

UNITED STATES PATENT OFFICE 2,134,307

CAMERA WITH FOCAL-PLANE SHUTTER

Alfred Croger Mayo, Richmond, England, assignor to Purma Cameras Limited, London, England, a British company Application June 29, 1937, Serial No. 150,924
In Great Britain February 6, 1936

3 Claims. (Cl. 95—55)

This application corresponds to the application of Alfred Croger Mayo, Serial No. 3,684/36, which was filed in Great Britain on February 6th, 1936.

This invention comprises improvements in or relating to cameras with focal-plane shutters. In United States Patent No. 2,017,979 there is described a camera having a sliding plate working close to the film surface to constitute a shutter-plate and the plate is released for movement across the exposure-aperture by means of a trigger which carries an auxiliary safety shutter located between the shutter-plate and the lens. Depression of the trigger moves the auxiliary safety shutter out of the way and at the same time releases the shutter-plate to make the exposure. The present invention may be applied to a camera having the characteristics just referred to, or to one in which a blind or the like is substituted for the shutter-plate. In the aforesaid United States Patent No. 2,017,979 there is in addition to the shutter-plate a covering-plate slidable relatively to and close against the shutter-plate and so controlled as to cover the exposure-aperture in the shutter-plate while the shutter is being set preparatory to making an exposure.

The present invention comprises in a camera the combination of a guide-plate containing a picture aperture against the back of which the sensitive surface is located, a rigid slidable shutter-plate working close in front of the guide-plate and provided with a permanently open exposure-slot, means to move the shutter-plate into a set position on one side of the exposure-aperture, a release-trigger to release the shutter-plate to make the exposure by a return movement and a safety shutter close to the lens of the camera operatively connected to the release-trigger so that the safety shutter is opened when the release-trigger is pressed prior to the release of the shutter but is closed to prevent exposure of the film during the setting movement. The statement that the exposure-slot in the shutter is permanently open means that it is open both during the setting and exposure of the sensitive surface. It will be observed that the safety shutter close to the lens is relied upon in this mechanism to prevent the exposure, no covering-plate being employed on the shutter-plate as in the previous constructions above referred to. By this means a substantial simplification of the mechanism is rendered possible.

In the preferred form of the shutter mechanism according to the invention the guide-plate and shutter-plate are curved so as to be concave on the side towards the lens. The curved shutter-plate is operatively connected to a setting lever pivoted within the camera about an axis parallel to the axis of curvature of the shutter-plate and lying on the concave side of the plate, said lever being yieldingly urged in one direction by a spring which constitutes the operating spring for the shutter. The lever may be connected to the shutter by a link pivoted to the shutter-plate and also engaged with the lever, for example by a detachable slot-connection.

A shutter-plate may carry means for adjusting the width of the exposure slot, which may be constituted by an auxiliary plate which is slidable relatively to the shutter-plate and carries an obturating edge which can be caused to overlap more or less, according to the position of adjustment, the exposure-slot in the shutter-plate.

According to a further feature of the invention a lost-motion is provided between the trigger and the release for the shutter-plate and the operative connections between the trigger and the safety shutter have such a velocity ratio as to ensure that the safety shutter moves completely out of the way of the lens-aperture before the lost-motion is taken up and the shutter-plate is released.

The following is a description by way of example of one construction in accordance with the invention.

In the accompanying drawings:—

Figure 1 is a longitudinal central section through a camera;

Figure 2 is an elevation of a camera from the back with the back cover and guide-plate removed, and Figures 3, 4 and 5 are details showing the shutter-plate in various positions.

The general arrangement of the parts of the camera is similar to that described in the aforesaid United States patent, but the construction illustrated is arranged to be made up from mouldable material instead of being built up from sheet steel. The camera has two flat side plates 11, 12 between which extends a front 13, moulded in one piece with the side plates and carrying a lens mount 14. The lens mount is capable of being slid telescopically in the front 13 and is yieldingly pressed forward by a spring 15. It is held inward by a cap when the camera is not in use, as described in the aforesaid patent. At the back of the lens mount there is a diaphragm plate 16 pierced with a rectangular aperture for the passage of the light from the lens.

Behind the front plate 13 and extending from side to side between the side plates there is a curved film guide-plate 17 having a picture-aperture 18 of the desired size of the pictures to be taken by the camera. The guide-plate 17 is concave on the side towards the lens so that in the centre portion, where the picture-aperture is, it is close to the back 19 of the camera, while towards its ends it sweeps forward close behind the front plate 13 so as to come in front of and shield off the mountings 20, 21 which are provided for the film spools. The guide-plate 17 rests on inwardly projecting locating ribs or flanges 22, 23 (Figure 2) which serve to locate it accurately in position and it is secured by lugs 24, 25 resting on moulded abutments 26, 27. It will be observed that the guide-plate 17 is thickened a little on each side of the picture-aperture 18 as indicated at 28, 29, so that the film which passes over the guide-plate is flattened where it comes opposite the picture-aperture, although the guide-plate even over the thickened portions 28, 29 is still slightly concave towards the lens, although not enough to carry the film sensibly out of the plane of focus of the lens. A spring 30 on the back 19 of the camera serves to press the film closely against the guides. Number-windows 31, 32 are provided in the camera back. A film-winder 33 is provided but is let flush into the side wall 12 of the camera. This side wall is moulded considerably thicker than the other side wall 11 so as to permit the operating parts to be located flush within the thickness of the side wall. An optical view-finder 34 is also located within the thickness of this wall.

The back cover-plate 19 is, of course, made readily detachable for loading purposes and is made to fit in a light-tight manner against the side walls and front 13 of the camera.

In front of the guide-plate 17 the side walls 11, 12 have further inwardly projecting ledges 35, 36 which are spaced somewhat from the guide-plates 17 and in this space the edges of a curved shutter-plate 37 are guided so as to slide freely. The shutter-plate 37 is provided with an abutment 38 which can be engaged, when the shutter-plate is at one extremity of its movement by a trip member 39 formed as part of a flat spring 40 secured to the side plate 11 of the camera. The trip member is operatively connected to a release-trigger 41 the head of which projects through the side-plate 12 to the outside thereof. The connections between the release-trigger and the trip 39 comprise a head 42 on the shank 43 of the trigger 41, which head comes opposite a portion of the spring 40, but in the normal position of the trigger is separated therefrom by a certain space so that there is a lost-motion before the trigger operates the trip. The shutter-plate 37 is urged in a direction away from that in which it would be held by the trip-member 39, that is to say in a downward direction in Figures 1 and 2, by means of a shutter spring 44 and it is capable of being wound back against the spring 44 into the "set" position by a lever 45 pivoted at 46, 47 in the side-plates 11, 12 and connected to a setting arm 48 recessed into the outside of the side-plate 12. The setting lever 45 is operatively connected to the shutter-plate 37 by a link 49 pivoted to the shutter-plate at 50 (Figure 3) and provided with a hook 51 which enters a slot 152 in the lever 45. This makes a detachable slot connection with the lever 45, which is very convenient in assembling the parts. It will be observed that the pivots 46, 47 of the setting lever 45 lie on an axis which is parallel to the axis of curvature of the shutter-plate 37 and that the shutter spring 44 acts on the shutter through the intermediary of the lever 45 and the link 49.

The shutter-plate itself is provided with an exposure-slot 52, best seen in Figure 5, although also visible in Figure 1. If this were the whole of the shutter mechanism it would, of course, be impossible to set the shutter-plate 37 by means of the setting lever mechanism 48, 45 without first capping the lens; otherwise the film would be exposed in the act of setting the shutter.

However, the trigger 41 is, according to the present invention, provided with operative connections to a safety shutter-plate 54. The safety shutter 54 is pivoted at 55 to the rear of the diaphragm plate 16 at the back of the lens mount and is capable, as shown in Figure 2, of closing the aperture in the diaphragm, or alternatively of being swung out of the way by movement in the direction of the arrow marked upon it in Figure 2. The edge of the safety shutter 54 which is remote from the pivot 55 enters beneath an overlapping lug 56 on the diaphragm plate 16 when the plate is closed and this keeps it closed against the diaphragm plate. The stem 43 of the trigger 41 carries a laterally projecting lug which is pivoted at 57 between an arm 58 and a second arm 59 projecting from the safety shutter 54. The length of this arm, relatively to the extent of movement permitted to the trigger 41 is such as to give a velocity ratio between the movement of the trigger and the movement of the safety shutter adequate to move the safety shutter completely out of the way of the lens 14 before the lost-motion between the foot 42 of the stem 43 and the spring 40 has been taken up and the shutter-plate 37 released. The return of the trigger 41 and of the safety shutter 54 to the position shown in Figure 2, when pressure on the trigger is released, is ensured by a spring 60 engaged at one end with the stem 43 of the trigger and at the other end with the extremity of the arm 58. On the front of the shutter-plate 37 is mounted a smaller sliding plate 61 for varying the width of the exposure-slot 52 in the shutter-plate. This auxiliary sliding plate 61 has an aperture 62, one edge 63 of which is capable of being moved so as to overlap more or less the exposure-slot 52. It is held on the shutter-plate by overlapping lugs 64. Three different widths of slot are shown in Figures 3, 4 and 5 corresponding to different positions of adjustment of the sliding plate 61.

In the drawings there is illustrated means for moving the sliding shutter-plate which comprise a heart-shaped cam 65 pivoted at 66 in the shutter-plate 37. The cam 65 is made sufficiently heavy always to hang with its rounded point lowermost. This presses against an upturned edge 67 of the sliding plate 61. When the camera is held upright in the positions shown in Figures 1, 2 and 3 the point of the cam presses the sliding plate 61 to the position where the exposure-slot is narrowest. If the camera is turned in a horizontal position, either side up, the cam will assume a position such as is illustrated in Figure 4, in which the sliding plate is permitted to move to a position where the slot is wider, and if the camera is inverted the parts assume the position shown in Figure 5, where the exposure slot is at its widest. No spring is provided for drawing the sliding plate 61 against the cam because the inertia of the plate causes it to lag behind the movements of the shutter-plate 37 even when the camera is held horizontally, and during the exposure movement of the shutter when the trigger 41 is pressed this carries the upturned edge 67 back into firm engagement with the cam. When the camera is held vertically the weight of the sliding plate 61 ensures it occupying the position shown.

It will be observed that there is a recess in the safety shutter-plate 54 which is co-axial with the lens mount 14. The purpose of this recess is to receive the back of the lens mount when the latter is pressed back into the camera by the use of the cap over the shutter and to thereby cause the lens mount to interlock with the shutter member and prevent operation of the shutter when the cap is in place.

There may be provided in accordance with the present invention means to intercept temporarily the motion of the curved shutter-plate 37 at the point at which the exposure-aperture 32 therein coincides with the picture-aperture 18 in the guide-plate 17. In this event the aperture 52 must be made as wide as the picture-aperture 18 and if the movement is thus intercepted a time exposure is made, the exposure being terminated by release of the trigger 41 which allows the auxiliary shutter-plate to return to the position in which it closes the light-aperture in the diaphragm 16 of the front plate 13.

It will be found that the location of the trigger 41 for the release of the shutter is convenient when the user of the camera is holding it close to his eye so that he can look through the viewfinder 34 because the trigger 41 comes into a convenient position for operation by the forefinger of the hand holding the camera.

I claim:—

1. In a camera the combination of a guide-plate containing a picture-aperture against the back of which the sensitive surface is located, a rigid slidable shutter-plate working close in front of the guide-plate and provided with a permanently open exposure-slot, means to move the shutter-plate into a set position on one side of the exposure-aperture, a trip member to engage the shutter-plate and hold it in set position and to release said shutter-plate to make the exposure by a return movement, which trip member is located in the space in front of the shutter-plate and behind the lens, a release trigger projecting into the interior of the camera from the outside into operative relation with the trip member, a safety shutter close to and behind the lens of the camera and means located in the said space behind the lens and in front of the shutter-plate, which means operatively connect said safety shutter to the release trigger so that the safety shutter is opened when the release trigger is pressed prior to the release of the shutter but is closed to prevent exposure of the film during the setting movement.

2. In a camera the combination claimed in claim 1, wherein the guide-plate and slidable shutter-plate are curved about an axis such that they are concave on the side towards the lens and the slidable shutter-plate is operatively connected to a setting lever within the camera pivoted about an axis parallel to the axis of curvature of the shutter-plate and lying on the concave side of the shutter-plate close to the plane of the safety shutter, said lever being yieldingly urged in one direction by a spring which constitutes the operating spring for the shutter.

3. In a camera the combination claimed in claim 1, wherein the guide-plate and slidable shutter-plate are curved so as to be concave on the side towards the lens and the slidable shutter-plate is operatively connected to a setting lever within the camera pivoted about an axis parallel to the axis of curvature of the shutter-plate and lying on the concave side of the shutter-plate close to the plane of the safety shutter, said lever being yieldingly urged in one direction by a spring which constitutes the operating spring for the shutter, and wherein the said lever is connected to the shutter by a link pivoted to the shutter-plate and also engaged with the lever.

ALFRED CROGER MAYO.